United States Patent Office 3,178,388
Patented Apr. 13, 1965

3,178,388
SILICA FILLERS REACTED WITH SEA WATER AND USES THEREOF
Oliver W. Burke, Jr., 506 Intracoastal Drive, Fort Lauderdale, Fla., and Carey B. Jackson, Pompano Beach, Fla.; said Jackson assignor to said Burke
No Drawing. Filed Oct. 3, 1961, Ser. No. 142,495
12 Claims. (Cl. 260—41.5)

The present invention relates to a special form of silica as filler and to the process for producing same and to natural, or synthetic rubber or other elastomers, such as silicone rubbers and plastomers containing such silica.

OBJECTS

Particular objects of the present invention, severally and interpendently, are to provide an improved process for reducing the alkalinity of pigment precipitated from an alkaline medium, the production of improved silica filler material, to provide such improved silica filler material at economic cost and to provide natural and synthetic rubber including silicone rubber and plastomers reinforced with such silica.

Other objects, and advantages of the invention will be apparent from a consideration of the herein set forth general and specific description of illustrative embodiments thereof.

STATE OF THE ART

It is known that silica fillers can be prepared by precipitation of silica in alkaline medium and then washing the silica with dilute acid to remove the free alkali. Thus in British Patent No. 299,483 (Peter Spence & Sons Ltd.) acceptance Oct. 29, 1928, such a silica pigment is produced in a substantially pure, extremely light form by neutralizing the alkali of a sodium silicate solution in the presence of a suitably regulated amount of sodium carbonate, by the gradual addition of sodium bicarbonate or carbon dioxide, the sodium carbonate being already present or being added as required, or being formed by the gradual addition of a solution of sodium bicarbonate or carbon dioxide. By these processes it is known to obtain a gradual separation of the silica in a non-gelatinous, somewhat flocculent, easily filterable white and opaque condition in combination or association with a portion of the alkali and in a physical condition such that after removal of the mother liquor, washing with water, after-treating with dilute acid and again washing and drying, the silica pigment shrinks but little compared with silica gel and is in an extremely light, white, soft and bulky form.

PRESENT INVENTION—IN GENERAL

Silica precipitated by any known method in alkaline medium with the aid of an acidifying agent such as sodium carbonate or carbon dioxide, with or without the additional sodium ion added prior to or during the acidulation, produces a silica filler material having residual alkali content expressed as $Na_2O$ as high as 10% to 14% or more.

According to the present invention it has been found that when such silica fillers having such alkali content are washed, soaked or boiled with sea water a filler of improved reinforcing properties is obtained.

In the practice of the present invention it has been found advantageous to employ 5 to 100 ml. or more, preferably 20 to 50 ml., of sea water per gram of silica pigment (dry basis) when such as been prepared from sodium silicate and contains residual alkalinity. The reacting of the silica pigment with the sea water may be effected by washing on the filter, or by slurring the initial filter cake of the precipitated silica with the sea water one or more times. The slurried pigment may be permitted to soak in the sea water for a period of five minutes to twelve hours or more if desired. Also the silica pigment, prior to, or during, or after, its reaction with the sea water may be kept at room temperature or heated to any selected temperature between about 20° C. and 150° C., a temperature of 95 to 105° C. being preferred when such heat treatment is employed, for a period of from about five minutes to two hours or more. After the treatment with the sea water, the silica pigment is preferably washed to remove excess electrolyte, and such washing does not detract from the improvement obtained. We are not able to explain the reason why reaction of the alkaline silica pigment with the sea water produces the marked improvement in reinforcing properties of the silica, or what particular combination of elements from the sea water with the silica is responsible for the improved silica pigment composition obtained, since the sea water contains a large variety of elements many of which are present in small quantities. However, sea water has about the same composition wherever obtained and does effect the improvement in a particularly economical manner.

By the term sea water is meant ocean water of which the following analysis is typical:

|  | (Percent) | (P.p.m.) |
|---|---|---|
| Chlorine (Cl) | 55.29 | 18,980 |
| Bromine (Br) | 0.19 | 65 |
| Sulfate (SO$_4$) | 7.69 | 2,650 |
| Carbonate (CO$_3$) | 0.21 | 140 |
| Sodium (Na) | 30.59 | 10,561 |
| Potassium (K) | 1.11 | 380 |
| Calcium (Ca) | 1.20 | 400 |
| Magnesium (Mg) | 3.72 | 1,272 |
|  | 100.00[1] |  |

[1] Water free basis (sea water salinity is about 3.5%).

The examples 1–B, 2–B, 3–B and 4–B show the effectiveness of sea water as an after-treatment for silica fillers prepared by precipitation of silica from an alkaline medium. The other examples are included for comparative purposes.

Example 1

In this example 3,000 ml. of commercial "N" grade 41° Bé. sodium silicate $(Na_2O(SiO_2)_{3.22}$ containing 6 moles of $Na_2O$ and 19.3 moles of $SiO_2$) was placed in porcelainized vessel and agitated with a 3 bladed propeller of 3″ diameter driven at 600 r.p.m. The sodium silicate solution was diluted with 11 liters of water and heated to 70° C. and further thereto were added 636 g. (6.0 moles) of sodium carbonate. A solution of sodium bicarbonate as acidulating agent was prepared by dissolving 1260 g. (15 moles) of sodium bicarbonate in 10 liters of water and this solution was gradually added over a period of about 50 minutes to the dilute sodium silicate maintained at a temperature of 70° C.

TABLE I

Acidulation
Time (minutes): (moles NaHCO$_3$ cumulative)
```
0  ------------------------------------------ —
2  ------------------------------------------ 1.7
4  ------------------------------------------ 3.0
6¹ ------------------------------------------ 4.1
7  ------------------------------------------ 4.5
14 ------------------------------------------ 5.3
19 ------------------------------------------ 5.8
20 ------------------------------------------ 7.8
21 ------------------------------------------ 8.8
22 ------------------------------------------ 9.4
23 ------------------------------------------ 10.4
28 ------------------------------------------ 15.0
```
[1] Initial precipitation of silica observed.

The silica precipitate filtered rapidly and the filter cake was water washed and divided into eight equal portions.

One portion of said filter cake was dried in a circulating air oven at 105° C. ground and screened through a 150 mesh screen and the product designated as silica 1–A.

Another portion of said filter cake was slurried with 3 liters of ocean sea water and allowed to soak for 2 hours, filtered and the filter cake washed with 4 liters of water. The filter cake was dried at 105° C., ground and screened through a 150 mesh screen and the product designated as silica 1–B.

Another portion of said filter cake was slurried with 3 liters of 0.06 molar calcium chloride solution and after 2 hours soaking the silica was separated by filtration, and the filter cake was water washed to remove excess calcium chloride. The treated filter cake was dried at 105° C., ground and screened through a 150 mesh screen and the product designated as silica 1–C.

Another portion of said filter cake was slurried with 3 liters of 0.66 molar zinc chloride solution and soaked for 2 hours, filtered and the filter cake washed with water. The filter cake was dried at 105° C., ground and screened through a 150 mesh screen and the product designated as silica 1–D.

Another portion of said filter cake was slurried with 1 liter of water and made acid to methyl orange with hydrochloric acid. The acidified precipitate was allowed to soak for 2 hours and then enough 0.01 molar sodium carbonate solution added to bring the pH of the solution back to about 6.5–7.0 and the silica filtered and the filter cake water washed. The filter cake was dried at 105° C., ground and screened through a 150 mesh screen and the product was designated as silica 1–E.

Another portion of said filter cake was slurried in 4 liters of water, placed in a pressure vessel and while agitating was subjected to 15 p.s.i. of carbon dioxide for 4 hours. The so-treated silica was filtered and the filter cake water washed, dried at 105° C., ground and screened and the product was designated as silica 1–F.

Portions of these six silicas 1–A, 1–B, 1–C, 1–D, 1–E and 1–F were compounded with a butadiene-styrene (SBR–1500) elastomer according to the compounding recipe set forth in Table II hereof.

TABLE II

Compound ingredients: Quantities (grams)

Butadiene-styrene copolymer [1] _____ 100.0
Silica filler material _____ 58.5
Antioxidant—2,2-methylene-bis (4-methyl-6-t.-butylphenol) [2] _____ 2.0
Triethanolamine _____ 1.0
Paracoumarone-indene resin [3] _____ 10.00
Stearic acid _____ 3.0
Zinc oxide _____ 5.0
Di-2-benzothiazyl disulphide [4] _____ 1.25
N,N'-di-o-tolylguanidine [5] _____ 1.75
Sulfur _____ 3.0

[1] SBR–1500.
[2] Antioxidant 2246, a trademark product of American Cyanamid Co.
[3] Cumar Resin RH, a trademark product of Allied Chemical Corp.
[4] Altax, a trademark product of R. T. Vanderbilt Co., Inc.
[5] DOTG, a trademark product of American Cyanamid Co.

In compounding the stock the selected silica pigment material is milled into the SBR–1500 together with the antioxidant and the triethanolamine and the stock aged overnight and then milled with the remaining compounding ingredients and cured for 45 minutes at 287° F.

The physical test data for the vulucanizates containing the silica samples 1–A through 1–F is set forth in Table III hereof.

TABLE III

| Silica tested (in vulcanizate) | Tensile (p.s.i.) | Elongation, Percent | Modulus (300%) | Hardness (Shore A) | Bulk density (g./cc. of silica) |
|---|---|---|---|---|---|
| 1–A | 2,850 | 575 | 750 | 67 | 0.158 |
| 1–B | 3,110 | 650 | 728 | 61 | 0.160 |
| 1–C | 3,065 | 600 | 938 | 63 | 0.147 |
| 1–D | 2,870 | 650 | 768 | 62 | 0.128 |
| 1–E | 3,120 | 525 | 1,512 | 67 | 0.132 |
| 1–F | 3,170 | 500 | 1,235 | 67 | 0.150 |

In general the after-treatment of this particular silica did not greatly improve the physical properties, however, Example 1–B in which the filter cake was treated with sea water gave the highest value for tensile-elongation comparison (tensile product=tensile×elongation was 2,021,500).

*Example 2*

In this example 3000 ml. of type "N" sodium silicate ($Na_2O(SiO_2)_{3.22}$) containing 6 moles of $Na_2O$ was diluted with 6 liters of water to which was added 348 g. (6 moles) of sodium chloride dissolved in 8 liters of water and the combination was placed in a ceramic vessel and was agitated at 600 r.p.m. by a 3 bladed 3" propeller. The acidulating agent consisted of 1260 g. (15 moles) of sodium bicarbonate dissolved in 15 liters of water. The acidulating agent was added to the dilute sodium silicate in a controlled manner according to Table IV herein.

TABLE IV

| Time (minutes cumulative) | Acidulation (moles $NaHCO_3$ cumulative) |
|---|---|
| 0 | -- |
| 6.2 | 1.1 |
| 119 [1] | 3.0 |
| 129 | 3.9 |
| 165 | 6.0 |
| 180 | 7.1 |
| 199 | 9.0 |
| 219 | 12.0 |
| 237 | 15.0 |

[1] Initial precipitation of silica.

The precipitated silica was allowed to stand overnight then filtered and slurried with 1 mole of sodium bicarbonate dissolved in 4 liters of water and let stand 1 hour, then filtered and reslurried with 4 liters of water, again filtered and then divided into 8 equal portions which were treated as follows:

A portion of said filter cake was dried overnight at 80° C., ground, screened and designated as silica 2–A.

Another portion of said filter cake was slurried in 4 liters of sea water and let stand for 2 hours, then filtered, water washed, dried, ground and designated as silica 2–B. Four liters of water were used.

A portion of said filter cake was made just acid to phenolphthalein by addition of 150 cc. of 2 N hydrochloric acid, after which it was filtered and twice reslurried in 4 liters of water and filtered. The filter cake was dried, ground and designated as silica 2–C.

The silica samples 2–A, 2–B and 2–C were compounded with elastomer and compounding ingredients in the same manner as was done in Example 1 (see Table II). The vulcanizates were cured at 287° F. for 45 minutes.

The physical test data of the resulting vulcanizates are set forth in Table V herewith.

TABLE V

| Silica tested (in vulcanizate) | Tensile (p.s.i.) | Elongation, Percent | Modulus (300%) | Hardness (Shore A) | Bulk density (g./cc. of silica) |
|---|---|---|---|---|---|
| 2–A | 738 | 400 | 632 | 71 | 0.350 |
| 2–B | 3,705 | 675 | 643 | 67 | 0.138 |
| 2–C | 3,500 | 650 | 912 | 70 | 0.180 |

In contrast to silica 1–A the tensile of the untreated silica 2–A is very low and the after-treatment with sea water to produce silica 2–B yielded a product of excellent tensile value and elongation.

Example 3

In this example 2790 grams of the aqueous solution containing 4 moles of sodium silicate of the composition expressed by $Na_2O(SiO_2)_{3.22}$ was diluted with 14 liters of water and placed in the precipitator vessel equipped with a low speed paddle stirrer. To this aqueous silicate of soda solution maintained at 25° C. while agitating was added over a period of about 5 hours 4 moles (424 grams) of sodium carbonate in 4 liters of water and concurrently over a period extending however to 8 hours was added 4.7 moles (207 grams) of carbon dioxide.

The rates of addition of the above materials is set out in Table VI hereof,

TABLE VI

| Time cumulative (minutes) | Sodium carbonate added cumulative (moles) | Acidulation (moles $CO_2$ cumulative) |
| --- | --- | --- |
| 0 | | |
| 70 | 1.02 | 0.62 |
| 130 | 1.50 | 0.85 |
| 190 | 2.00 | 0.95 |
| 250 | 2.38 | 1.02 |
| 295 | 4.00 | 1.10 |
| 370 | | 1.20 |
| 430 | | 1.31 |
| 490 | | 2.00 |
| 500 | | 2.65 |
| 510 | | 4.00 |

Precipitation of the silica pigment began when about 1.4 moles of the carbon dioxide (per 4 moles of the sodium silicate) had been added and was apparently complete before the entire 4 moles had been added.

The silica precipitate was filtered and washed with 1 liter of water. About one-third of this filter cake was water washed, dried in an oven at 105° C., ground, and screened through a 150 mesh screen and this product was designated as silica 3–A.

A second portion of the filter cake was mixed with 3 liters of sea water and then allowed to stand for 12 hours, then filtered, washed in 4 liters of water and dried and ground, and the product was designated as silica 3–B.

A third portion of said filter cake was further water washed and acidified with 2 N hydrochloric acid until acid to methyl orange then sufficient sodium carbonate was added to make the precipitate just alkaline to methyl orange then the precipitate was filtered, washed and dried in an oven at 105° C., ground and screened through a 150 mesh screen and this product was designated as silica 3–C.

The silica pigment materials designated as silicas 3–A, 3–B and 3–C were each compounded with a butadiene-styrene type elastomer (SBR–1500) according to the compounding recipe set forth in Table II hereof.

The compounded stocks containing the silica samples were cured for 45 minutes 287° F. The physical data for the vulcanizates containing these silica samples is set forth in Table VII hereof.

TABLE VII

| Silica tested (in vulcanizate) | Tensile (p.s.i.) | Elongation, percent | Modulus (300%) | Hardness (Shore A) |
| --- | --- | --- | --- | --- |
| 3–A | 925 | 450 | 512 | 67 |
| 3–B | 3,350 | 600 | 937 | 68 |
| 3–C | 2,870 | 575 | 1,000 | 70 |

The silica sample 3–B of this example which was treated with sea water exhibited a great improvement in tensile strength over the untreated silica sample 3–A and had better physical properties than the silica 3–C treated with mineral acid.

Example 4

This example was carried out in a manner similar to Example 3. To 2000 ml. of a 41° Bé. aqueous solution containing 4 moles sodium silicate of the composition represented by $Na_2O(SiO_2)_{3.2}$ was added 14 liters of water and placed in a precipitator vessel equipped with an agitator and the temperature thereof raised to 78° C. To this hot aqueous sodium silicate solution was gradually added 4 liters of an aqueous solution containing 4 moles of sodium carbonate and concurrently therewith but over a more extended period was added 4 moles of carbon dioxide.

The rates of addition of these materials are set out in Table VIII hereof.

TABLE VIII

| Time cumulative (minutes) | Sodium carbonate added cumulative (moles) | Acidulation (moles $CO_2$ cumulative) |
| --- | --- | --- |
| 0 | | |
| 55 | 0.04 | 0.70 |
| 70 | 0.24 | 0.72 |
| 85 | 0.36 | 0.76 |
| 100 | 0.46 | 0.78 |
| 130 | 0.58 | 0.80 |
| 160 | 0.82 | 0.83 |
| 190 | 1.04 | 0.94 |
| 220 | 1.05 | 1.24 |
| 235 | 1.44 | 1.48 |
| 250 | 2.56 | 1.80 |
| 265 | 4.00 | 2.88 |
| 270 | | 3.68 |
| 275 | | 4.23 |

The precipitated silica was filtered and the wet silica filter cake was divided into portions and treated in a manner exactly similar to silica samples 3–A, 3–B, and 3–C respectively and designated as 4–A, 4–B and 4–C respectively. These silica samples were compounded using the compounding recipe set forth in Table II hereof and the stocks cured for 45 minutes at 287° F.

The physical test data for the respective vulcanizates containing the foregoing silica pigments examples is set forth in Table IX hereof.

TABLE IX

| Silica tested (in vulcanizate) | Tensile (p.s.i.) | Elongation, percent | Modulus (300%) | Hardness (Shore A) |
| --- | --- | --- | --- | --- |
| 4–A | 1,485 | 450 | 758 | 71 |
| 4–B | 3,640 | 650 | 785 | 65 |
| 4–C | 3,180 | 550 | 1,080 | 68 |

In this example the silica 4–B treated with sea water had improved physical properties when compared with the untreated 4–A or the acid treated silica 4–C.

Example 5

In this example 2000 ml. of 41° Bé. commercial sodium silicate containing 4 moles of $Na_2O(SiO_2)_{3.22}$ was diluted with 12 liters of water and was placed in a closed pressure vessel with paddle agitator running at moderate speed. Then gradually to the vessel while stirring was added 8 moles (467.6 g.) of sodium chloride dissolved in 4 liters of water and 4.8 moles (211.2 g.) of carbon dioxide. In Table X the rates of addition of aqueous sodium chloride solution and carbon dioxide gas are set forth.

TABLE X

| Time cumulative (minutes) | Sodium chloride cumulative (moles) | Carbon dioxide cumulative (moles) |
|---|---|---|
| 10 | 1.0 | 0.06 |
| 40 | 1.68 | 0.54 |
| 70 | 1.88 | 0.68 |
| 130 | 2.20 | 0.80 |
| 145 [1] | 2.20 | 0.91 |
| 175 | 3.20 | 1.00 |
| 205 | 4.00 | 1.06 |
| 235 | 4.60 | 1.08 |
| 280 | 6.20 | 1.08 |
| 295 | 8.00 | 1.10 |
| 340 | | 1.11 |
| 370 | | 1.15 |
| 385 | | 1.22 |
| 400 | | 1.30 |
| 445 | | 1.40 |
| 490 | | 1.90 |
| 505 | | 2.52 |
| 510 | | 4.35 |
| 513 | | 4.80 |

[1] Initial precipitation of silica.

The silica precipitate was filtered and washed with water and the filter cake divided into 5 portions.

A first portion of this filter cake was further water washed, filtered, dried in an oven at 105° C., ground, screened through a 150 mesh screen and this product was designated "silica 5–A."

A second portion of said filter cake was further water washed and acidified with 2 N hydrochloric acid until acid to methyl orange then sufficient sodium carbonate was added to make the precipitate just alkaline to methyl orange then the precipitate was filtered, washed and dried in an oven at 105° C., ground and screened through a 150 mesh screen and this product was designated as "silica 5–B."

A third portion of the filter cake was treated in the same manner as "silica 5–B" heretofore, except that said precipitate was slurried in water and boiled for ½ hour and then was made acid to methyl orange and then sufficient sodium carbonate was added to make said precipitate just alkaline to methyl orange. The filtered, washed, dried and ground product was designated as "silica 5–C."

A fourth portion of the silica filter cake was boiled for 1 hour with 3 liters of sea water and then filtered, water washed with fresh water and dried in an oven at 105° C., ground and screened through a 150 mesh screen and this product was designated as "silica 5–D."

A fifth portion of the silica filter cake was soaked for 12 hours with 3 liters of sea water and then filtered, water washed with fresh water and dried in an oven at 105° C., ground and screened through a 150 mesh screen and this product was designated as "silica 5–E."

The silica filter materials designated 5–A, 5–B, 5–C, 5–D and 5–E were each compounded with a butadiene-styrene elastomer (SBR–1500) according to the compounding recipe set forth in Table II hereof.

In compounding the stock the selected silica pigment material was milled into the SBR–1500 together with the antioxidant and triethanolamine and the stocks aged overnight, and then milled with the remaining compounding ingredients and cured for 45 minutes at 287° F.

The physical test data for the respective vulcanizates containing the foregoing silica pigment is set forth in Table XI hereof.

TABLE XI

| Silica tested (in vulcanizate) | Tensile (p.s.i.) | Elongation, percent | Modulus (300%) | Hardness (Shore A) |
|---|---|---|---|---|
| 5–A | 1,620 | 475 | 750 | 69 |
| 5–B | 2,755 | 475 | 1,505 | 69 |
| 5–C | 2,500 | 450 | 1,400 | 67 |
| 5–D | 2,785 | 600 | 895 | 64 |
| 5–E | 3,420 | 600 | 855 | 63 |

This silica sample 5–D and especially 5–E both of which were after-treated with sea water had improved physical properties when compared with the same silica treated with acid.

Example 6

When Example 5 is repeated except that instead of filtering the silica upon finishing the acidulation there is gradually added with mild agitation over a period of 4 hours 22 liters of sea water, the resulting product being filtered, the silica precipitate being washed with 4 liters of fresh water, dried at 105° C. ground and sieved through a 150 mesh screen, a siliceous filler of comparable reinforcing properties is obtained.

In place of the butadiene-styrene elastomer employed in Examples 1 to 6, one can employ other polymers selected from the class consisting of the elastic and plastic high polymers. Such high polymers generally may be benefited by compounding with the improved silica pigments of the present invention. These elastomeric and plastomeric high polymers include, but are not limited to, the diolefin polymer rubbers which comprise the natural rubbers and the synthetic rubbers such as the rubbery homopolymers and copolymers prepared by aqueous or anhydrous copolymerization of $C_4$ to $C_6$ aliphatic conjugated dienes and mixtures thereof, e.g. polybutadiene, polyisoprene, polychloroprene, etc., and of such dienes with co-monomers, such as butadiene-styrene copolymer rubber, butadiene-vinyltoluene copolymer rubber, butadiene-acrylonitrile copolymer rubber, butadiene-acrylic ester copolymer rubber, butadiene vinylpyridine copolymer rubber, isobutylene-isoprene copolymer rubber, and the like; silicone rubbers; and plastomers such as polyethylene, polypropylene, polyvinyl chloride, polyvinyl acetate, etc.

Also the improved filler may be compounded with the elastic or plastic material in various ways, e.g. the silica pigment, following its reaction with sea water, may be slurried with an aqueous dispersion of the natural or synthetic elastomer or plastomer, and the polymer-silica dispersion may then be recovered with or without prior mechanical working; or the silica pigment as wet filter cake may be dispersed in the dry polymer in suitable equipment such as a Banbury mixer, especially one designed for dewatering; hence it is not essential that the sea water treated filter cake be dried and ground to form a dry pigment to be dispersed in the elastomer or plastomer although the latter procedure is convenient when the silica pigment is to be transported over considerable distances for compounding with the elastic or plastic material.

While there have been described herein what are at present considered preferred embodiments of the invention, it will be obvious to those skilled in the art that minor modifications and changes may be made without departing from the essence of the invention. It is therefor understood that the exemplary embodiments are illustrative and not restrictive of the invention, the scope of which is defined in the appended claims, and that all modifications that come within the meaning and range of equivalents of the claims are intended to be included therein.

We claim:

1. The process of improving silica pigment which has been precipitated in alkaline medium with the aid of an acidifying agent and which contains residual alkalinity, which process essentially comprises the step of reacting the silica pigment with sea water by treating the same with at least 5 milliliters of sea water per gram of silica (dry basis) at temperatures between 20° C. and 150° C.

2. Process of claim 1, wherein the silica pigment is soaked in the sea water for a period of at least 5 minutes.

3. Process of claim 2, wherein the soaking is conducted for a period in the range of 5 minutes to 12 hours.

4. Process of claim 1, wherein the silica pigment is boiled in the sea water.

5. Process of claim 1, wherein the silica pigment has been prepared from sodium silicate by precipitation with carbon dioxide.

6. Process of claim 1, wherein the silica pigment has been prepared from sodium silicate by precipitation with sodium bicarbonate.

7. An improved filler material consisting essentially of the composition produced by the reaction of an alkaline silica pigment with sea water, said alkaline silica pigment having been precipitated in alkaline medium with the aid of an acidifying agent, and said reaction having been effected by treatment of the alkaline silica pigment with at least 5 milliliters of sea water per gram of the silica (dry basis) at temperatures between 20° C. and 150° C.

8. A polymer composition comprising a polymer selected from the class consisting of the elastic and plastic high polymers and as a filler the composition produced by the reaction of an alkaline silica pigment with sea water, said alkaline silica pigment having been precipitated in alkaline medium with the aid of an acidifying agent, and said reaction having been effected by treatment of the alkaline silica pigment with at least 5 milliliters of sea water per gram of the silica (dry basis) at temperatures between 20° C. and 150° C.

9. Process of claim 1, wherein the silica pigment has been prepared by precipitation from an aqueous solution of sodium silicate containing sodium ions in addition to those resulting from the sodium silicate, with the aid of the acidifying agent.

10. Process of claim 1, wherein the silica pigment is treated with from 20 to 50 milliliters of sea water per gram of silica pigment (dry basis) for a period of at least 5 minutes at a temperature of from 95 to 105° C.

11. A polymer composition comprising an elastomeric high polymer containing as a reinforcing filler the composition produced by the reaction of an alkaline silica pigment with sea water, said alkaline silica pigment having been precipitated in alkaline medium with the aid of an acidifying agent, and said reaction having been effected by treatment of the alkaline silica pigment with at least 5 milliliters of sea water per gram of the silica (dry basis) at temperatures between 20° C. and 150° C., said elastomeric high polymer being selected from the group consisting of the diolefin polymer rubbers and the silicone rubbers.

12. A polymer composition comprising a plastomeric high polymer containing as a reinforcing filler the composition produced by the reaction of an alkaline silica pigment with sea water, said alkaline silica pigment having been precipitated in alkaline medium with the aid of an acidifying agent, and said reaction having been effected by treatment of the alkaline silica pigment with at least 5 milliliters of sea water per gram of the silica (dry basis) at temperatures between 20° C. and 150° C., said plastomeric high polymer being selected from the group consisting of polyethylene, polypropylene, polyvinyl chloride and polyvinyl acetate.

References Cited in the file of this patent

UNITED STATES PATENTS

| | | |
|---|---|---|
| 2,806,012 | Allen | Sept. 10, 1957 |
| 2,884,402 | Bachmann et al. | Apr. 28, 1959 |

FOREIGN PATENTS

| | | |
|---|---|---|
| 299,483 | Great Britain | Oct. 29, 1928 |